July 12, 1960 R. K. NEWCOMB 2,944,587
LAMINATING MACHINES
Filed Feb. 10, 1958 2 Sheets-Sheet 1
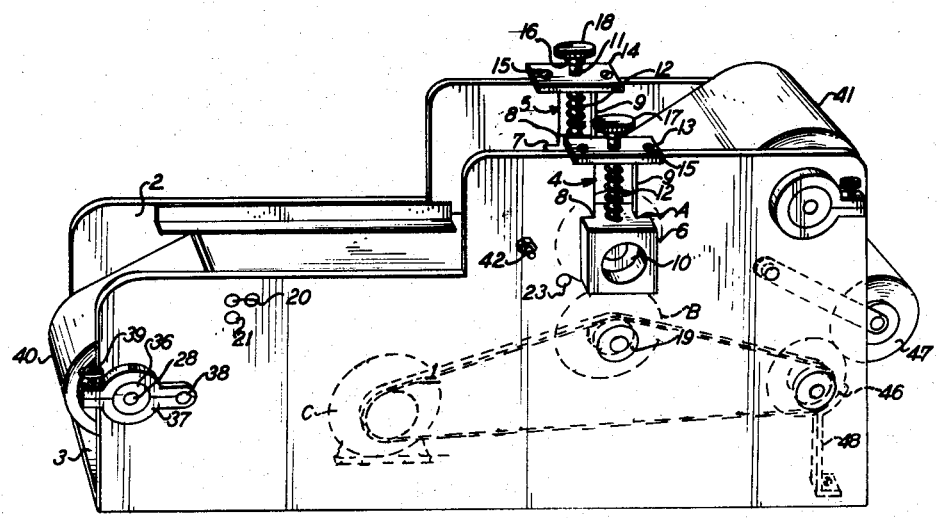
Fig.1
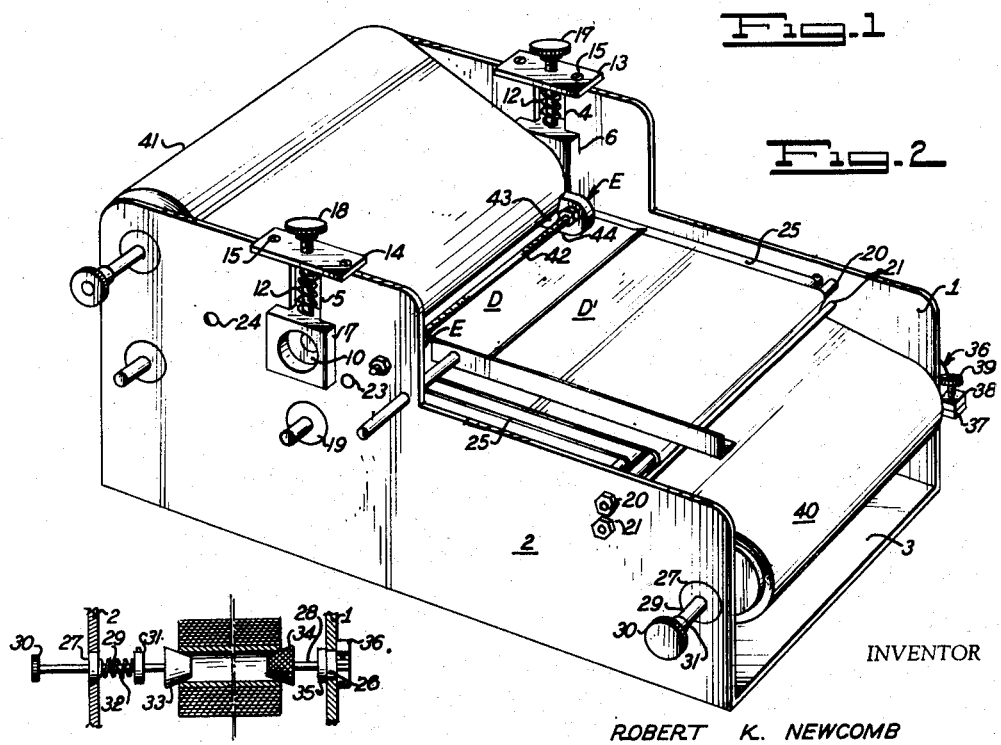
Fig.2
Fig.9
INVENTOR
ROBERT K. NEWCOMB
BY 
ATTORNEY July 12, 1960
R. K. NEWCOMB
2,944,587
LAMINATING MACHINES
Filed Feb. 10, 1958
2 Sheets-Sheet 2
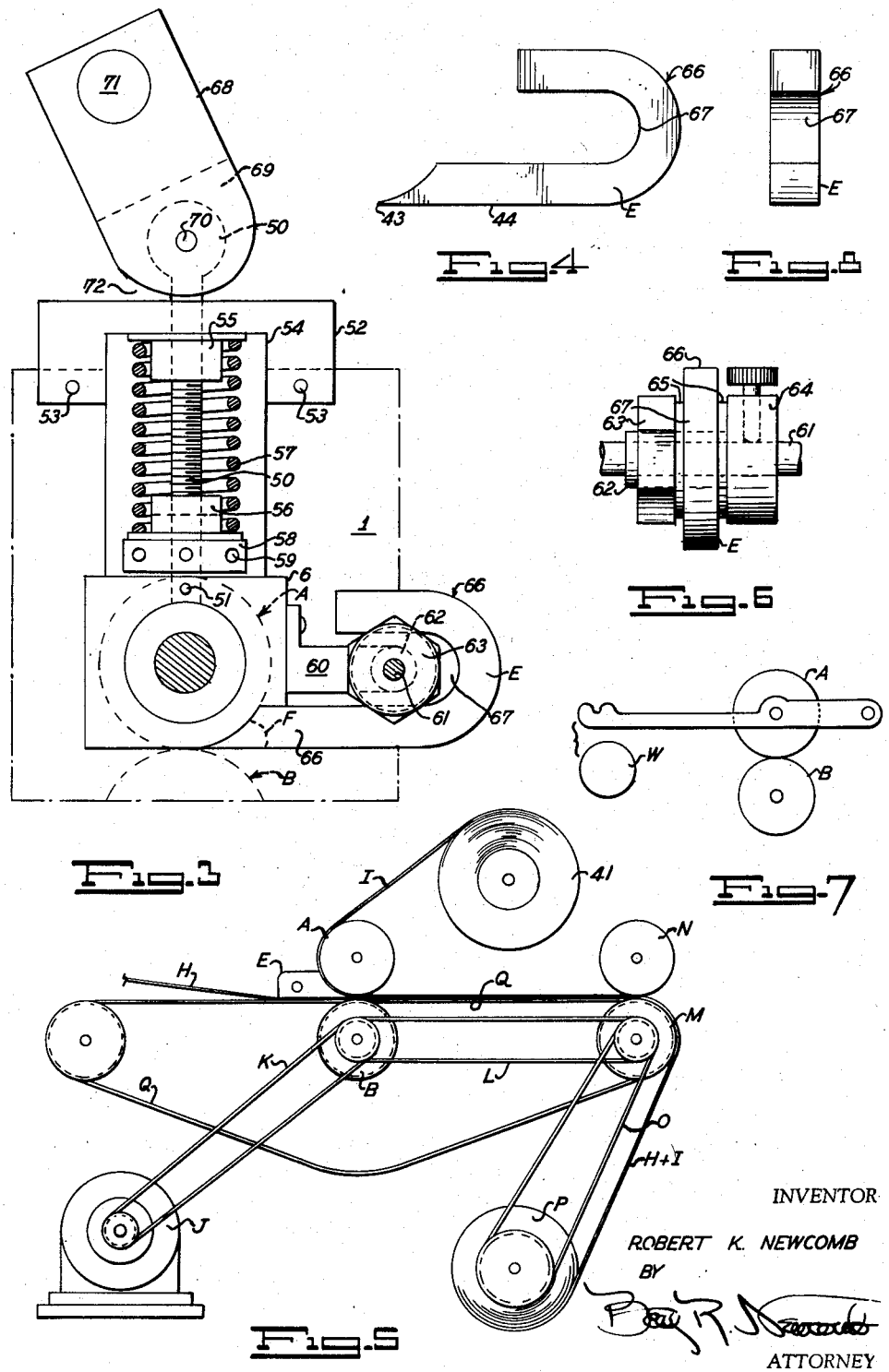
INVENTOR
ROBERT K. NEWCOMB
BY
ATTORNEY

United States Patent Office 2,944,587
Patented July 12, 1960

2,944,587
LAMINATING MACHINES

Robert K. Newcomb, Bound Brook, N.J., assignor to Rotobond, Bound Brook, N.J., a corporation of New Jersey Filed Feb. 10, 1958, Ser. No. 714,355

6 Claims. (Cl. 154—36)

This invention is a machine for combining webs and/or sheets of paper, plastic, textiles and the like to form a composite article having either utilitarian or decorative values not inherent in the individual component layers of which the composite article may be constituted. For instance a printed sheet or web having practically no resistance against deterioration from moisture, the abrasive character of dirt, oxidation, grease and folding may be protected and preserved on one or both sides by a layer of transparent film such as cellulose acetate, vinyl, Saran, Mylar, Vitafilm, Kodapak, epoxy resins, polyester resins, or by a combination of films interspersed with a thin adhesive layer of a material such as a polyvinyl acetate, or a water dispersion of latex, or a 100% solids in originally fluid form such as the epoxy resin either in combinations or as a final film, the selection of the bonding agent or surface layer being dependent upon its compatibility with the materials to be layered or laminated and the ultimate use for which the composite product is destined.

A main feature of the invention resides in the ability to form an intermediate layer of protective bonding agent between two materials at least one of which may be a barrier against moisture while simultaneously spreading the bonding agent uniformly over the adjacent meeting surfaces of the composite product and without the necessity of applying heat.

An object of the process and the machine is to enable the operator, by the type and selection of materials, to be able to process these materials together in a single operation such that any solvents in the bonding layers may be dissipated in or through or between the materials themselves without the necessity of heat which usually means providing for the immediate escape of vaporized solvents with the attendant difficulties of delamination areas or bubbles, and also avoiding the hazardous conditions of toxic or explosive gases which are contained in air released in the usual solvent heat lamination processes, and the removal of which results in an expensive process to operate, to say nothing of the tremendous size and price of the original installation, and the cumulative costs of operating the equipment from the standpoints of larger floor space, insurance premiums, lost solvent, separate storage requirements for safety and the like as well as the cost of the heat required for processing.

There are, of course, on the market various small machines which effect a bond between a precoated film and a printed sheet, however, these use a specially coated film prepared outside the machine itself and at considerable expense and then used in these small machines to combine under heat and/or pressure. The difference between this invention and these small machines using pre-coated film is evident from the fact that these small machines have a material and operating cost under present market conditions, of approximately 5¢ per 8½ x 11 letter size sheet laminated one side only as compared with this invention where the material cost is 1¢ per side and the time per side about 10 seconds as against 4 seconds for the present invention.

Other features and advantages of the present invention will be apparent from the following description in connection with the accompanying drawings illustrating the features and methods of the machine and processing of materials handled thereby.

In the drawings:

Figure 1 is a perspective of one machine built to carry the operation into commercial effect.

Figure 2 is a view similar to Figure 1 but of the opposite side of the machine.

Figure 3 is a side elevation viewed toward the inside of the frame showing a different and preferred form of mounting the laminating rolls, crosshead and dams whereby the upper roll and dams may be simultaneously raised and again lowered to laminating position without changing the nip pressure adjustment or the adjusted relationship of the dams to the cooperating laminating roll.

Figure 4 shows the reversed C form of dam.

Figure 5 is a diagrammatic side elevation of the laminating machine, its driving system and the process and method of operation with a continuous backing web, with winding up of the laminated product.

Figure 6 is a view of the width adjustment for the dams.

Figure 7 shows the weight method of adjusting the nip roll pressure.

Figure 8 is a front view of the side dam.

Figure 9 is a sectional view of the backing web unwind.

In detail, and with reference to Figures 1, 2 and 3, the machine embodies paralleled upright side frames 1 and 2 on a horizontal base 3.

These side frames 1 and 2 are oppositely cut out as at 4 and 5, respectively, to receive vertically movable crossheads 6 and 7. These crossheads 6 and 7 are grooved on opposite side faces as at 8 and 9 to form ways riding on the vertical faces of the cut outs 4 and 5; as the crossheads are identical a single description will serve for both without duplicating reference characters. Each crosshead carries a substantially centrally located ball bearing 10 of the sealed type. Fixed into the upper horizontal face of each crosshead 7 and 8 is a threaded spindle 11 over which is placed a coil spring 12 restrained by keeper bars 13 and 14 let in flush with the respective frames 1 and 2 at the top and held by flush screws 15 so as to confine the springs 12 between the keeper bars 13 and 14 and their corresponding crossheads 6 and 7 and urge or force the crossheads 6 and 7 downwardly. Placed on the upper threaded ends of spindles 11, above the keeper bars 13 and 14, are collars 16 which are surmounted by knobs or hand wheels 17 and 18 threaded on the spindles 11 and which may thus be used to raise or lower the crossheads 7 and 8 any desired amount for purposes which will hereinafter appear. Journalled in the bearings 10 and lying horizontally between the crossheads 7 and 8 is one of the combining rolls A which is raised and lowered by the movement of the handwheels 17 and 18; the lower combining roll B is fixed in location by being journalled in ball bearings 19 located in the side frames 1 and 2, as shown, directly beneath the vertical centerline of the bearings 10 of the crossheads 6 and 7 so that both the combining rolls A and B have parallel horizontal axes when brought into contact with one another along the nip line which is then at right angles with the planes of the vertical side frames 1 and 2; all holes in the frames, base and crossheads are bored to gauges, or jig bored, to insure parallelism of lateral members extending between the frames and interchangeability when assembling. The frames 1 and 2 are further braced and stiffened by shouldered spacer bars of suitable diameter with threaded ends extending through the frames and fixed in position by cap screws and since these are all similar except as to location a description of one will suffice for all. Two of these spacer bars 20 and 21 having a diameter of half inch and of the exact length dimension to space apart the frames 1 and 2 are located at the feeding end of the machine as shown and are tapped at each end thereof to receive ⅜" cap screws 22 thus, when in place, these rigidly secure the side frames 1 and 2 in parallel relation, similar spacers 23 and 24 extend between the frames 1 and 2 at suitable locations, the spacer 23 being in advance of the combining rolls A and B as shown while the spacer 24 is located higher up in the frames 1 and 2 and behind the rolls A and B. The spacers 20 and 23 are on a level with and parallel horizontally with the line of the nip between the combining rolls A and B, the lower roll B is of neoprene rubber and its normal diameter is the same as the diameter of the upper roll A, but by the pressure of the upper roll A coming into laminating relationship with the softer roll B the line of the nip is slightly depressed below the normal level of the surface of the roll B when free of the pressure from roll A, thereby affording more than just a simple line of tangential contact between the two rolls A and B; this nip area is an important feature in the functioning of the machine for laminating purposes according to the process and methods of this present invention. It has been found, in practice, that a suitable pressure on a 2½" metal roll A having a length of 24" bearing on a neoprene rubber roll B of similar length having a durometer of 35 will afford a satisfactory nip area and pressure with a compression of 10 pounds urging the rolls together when an air impervious film, such as Eastman Kodak Company triacetate or Celanese Corporation acetate is used in conjunction with a litho offset inked sheet of coated paper stock having a thickness of .003" with a bonding adhesive made with a range of 40% to 60% solids of the type, for instance, of polyvinyl acetate, or a water dispersion of latex and will afford immediate tack between the laminated layers with a uniform spread of the bonding adhesive over the width of the nip area at the marrying of the sheets and web, and that this produces a thin transparent bond of the order of 4000 square inches per 1.25 oz. of polyvinyl acetate adhesive having approximately 40% solids and with no apparent effect on the brightness or colors of the printed sheet if there is no dusting powder present on the offset work.

The bond is sufficiently stable to permit immediate use and becomes so permanent after a few moments as to split the image off the paper when attempting to peel the acetate from the laminated combination and if the paper is properly selected a perfect positive transparency will result. On the other hand an additional slight ageing of a few minutes results in such a substantial bond that the total sheet is destroyed by delayering of the paper when trying to peel off the lamination. This intermediate step of producing a direct positive transparency is also a feature of the comprehensive process and methods of the present invention and has uses in the printing art for quick processing of lithographic plates.

With the two spacers 20 and 23 located, as they are, on a plane with each other horizontally and vertically a feeding table 25 is placed upon these with the leading or forward edge immediately adjacent to and parallel with the line of the nip between the combining rolls A and B and thus the sheets may be rested on this table and propelled forward into the nip; the end of this feeding table 25 is curved around the stretcher bar 20 with a half round curvature to prevent it sliding into the nip. This table 25 also forms a cover for the variable speed drive unit C mounted on the base 3 therebeneath, the manner of driving being hereinafter described and illustrated.

At the feeding end of the machine as shown in detail in Figure 9 and sliding horizontally through ball bearings 26 and 27 in the side frames 1 and 2 are spindles 28 and 29 the latter having a knob 30, a locating collar 31 confining a coil spring 32 between it and the inside face of the frame 2, and a bundle core cone 33 whereby this cone is urged inward by the pressure of the coil spring; the opposite spindle 28 has a serrated surface cone 34 on its inner end, a similar adjustable locating collar 35 and, on the outside of the frame 1, it carries an adjustable brake drum 36 set screw fixed to its spindle 28 and surrounded by an adjustable split brake band 37 fastened by a stud 38 to the frame at one side and capable of being constricted around the drum by a thumb screw 39 to close or open the split brake band and thus increase or reduce the friction on the brake drum 36.

In one phase of the operation of this machine a roll of cheap plain newsprint or kraft paper 40 is gripped between the bundle cones 33 and 34 with the serrated cone 34 and brake acting as a tensioning means for the kraft paper web as it is drawn from the roll 40; the free end thereof being passed upwardly between the stretcher 21 and over the curved edge of the feeding table 25 and then on thru the nip of the laminating rolls A and B. A similar arrangement of spindles, knob, collars, cones, brake drum and brake band carries a roll of acetate or other film 41; as these elements for mounting the roll of acetate or other film 41 are duplicates of those for the mounting of the roll of kraft 40 it is believed to be unnecessary to duplicate the description and the corresponding parts are therefore given identical reference characters in an effort to simplify and shorten this description. When the nip rolls A and B are rotated it will be obvious that the kraft and acetate webs are drawn into the nip in overlying relation, when the nip is closed.

In this phase of the process the kraft web from the roll 40 simply acts as a carrier strip conveying sheets D laid thereupon through the nip where they are laminated together when a supply of fluid bonding adhesive is fed to the nip between the acetate web and the sheet D; the action of rolling the two together, at the nip, serves also to spread the adhesive in a thin film between the upper face of sheet D and the acetate web.

In order to marginally confine the adhesive and form a reservoir therefore, side dams E are provided and are adjustable along the threaded stretcher bar 42, these dams are identical and have a forward face contoured to the face of the metal roll A and a bearing thereagainst of about ½ inch width while the bottom face is horizontal. The contoured face and horizontal bottom face meet in an attenuated projection entering almost to the nip but stopped short enough to preclude the possibility of being drawn into the nip.

In this relationship above described the machine is ready to laminate except for some means of providing a uniform adhesive coating between the surface of the acetate or other film and the sheet to be laminated. A reservoir for the adhesive is formed at the nip by the adjustable side dams E which are movable along the threaded spacer bar 42 and may be set in any adjusted position therealong by lock nuts on each side of the dams.

The face of each dam E toward the nip being curved from the thin attenuated lower leading edge 43 upwardly to fit the contour of the nip roll A while the bottom face 44 is substantially parallel to the plane of movement of the sheet to be laminated. A clearance hole or cutout permits easy adjustment of the dam along the threaded spacer bar 42 and, at the same time, makes it possible to allow for the thickness of the film passing over the roll A and that for the sheet or sheets or webs passing into the nip.

Once set for a particular job these dams E then are able to confine a puddle F of adhesive of about the consistency of heavy maple syrup between the dams E and in the nip. As the progress of the sheet and webs is always towards the nip the puddle of adhesive is continuously being rolled into the nip and spreads uniformly between the web of film and the sheets when thus trapped between them. The pressure of the nip determines the thickness of the adhesive film.

These dams E, at each side, are each set to slightly overlap their thickness of ½ inch on the opposite side margins of the sheets being laminated and their curved leading faces bear against the film face as it passes over the upper nip roll. I have found that with a width of dam of ½ inch and with adhesive of the approximate consistency and viscosity mentioned, and at a laminating rate of 30 feet to 1800 feet per hour, the pool of adhesive does not travel to the rear of the machine because the sheet constantly moves it forward; also, leakage beneath the lower faces of the dams when set for the thickness of the materials being laminated extends to less than the ½ inch width of the lower horizontal faces as well as the contoured faces of the dams where these dams contact the film and the sheets being laminated; thus, substantially no leakage occurs beyond the edges of the sheet and film and this makes it possible to laminate slightly short of the side edges of the sheet being faced with the film and therefore leaves a smooth free edge at each side for subsequent squaring, stacking, and trimming when either sheets or web printed stock is laminated. Fairly thick laminations are possible and in the machine illustrated in the drawings laminations up to ¼ of an inch thick have been processed. With heavy thickness, however, the dams may be allowed to float instead of being confined against a vertical movement and as the machine is run and this thickness passes through the rolls they are elevated with the upper nip roll and the piece being laminated. For such thickness it is desirable to block the rolls apart a portion of the thickness dimension of such a thick sheet but with anything up to 10 point board any shimming apart of the rolls is not necessary and since it is unusual to handle such thicknesses, except in the case of plaques, no special set-up is necessary.

However, with heavy sheets the dams may be made adjustable along a bar held on links pivoted on the end journals of the nip roll and thus the dams once adjusted in relation to the roll rise and fall with the upper nip roll and do not lose their adjustment to the face thereof.

As I have previously described the kraft web 40 is pulled from the roll through the nip by the drive of the machine, as in a simple two roll wringer while, at the same time, the acetate film 41 is also pulled through the nip. The sheet to be laminated is laid upon the kraft web 40 and passes beneath the dam E and into the nip where it is covered by the adhesive and the film instantaneously with a uniform layer. The printed or other sheet to be laminated and bearing the reference character D passes through the nip without any adhesive traveling to the underside and thus it emerges from the nip, as does also the film, practically free of the kraft web 40 but with the sheet and the film bonded together under the pressure of the nip since the adhesive has immediate tack. The adhesive being used is either National Strach Company's polyvinyl acetate or Polymer Industries natural latex and each is so compounded as to provide immediate tack. Before the sheet D has completely entered under the dams E the next succeeding sheet D¹ is slipped in slightly underlapped relation as indicated and thus by the action of the carrier web 40 when a following finger of the operator, or a roller not shown, is kept on this sheet it naturally follows the web right into the nip and thus each succeeding sheet is laminated and the whole emerges as a web form free of the backing web 40 and in a condition to be either fed through the machine as a web without special sheet feeding for second side lamination or, if only one side lamination is desired, then the sheets may be individually separated either by cutting or notching the edges or tearing them apart along the line of juncture. The process is continuous so long as there is a supply of adhesive in the nip, and a supply of film, a carrier strip and the sheets are fed in in this overlapping relation. Pull rolls 46 and 47 riding together following the laminating nip serve to carry the laminated product and its backing carrier web through the machine and at this location the laminated product may be wound up in any suitable manner. Springs 48 very lightly contacting the lower of the two pull rolls 46 serve to insure freeing the webs from the pull rolls as they emerge. The backing web of kraft paper and the laminated web may be rolled up separately if desired by any suitable means, however, also a continuous backing web strip of Mylar, Teflon or Kel-F onto which the sheets are fed may replace the kraft paper and be guided through the machine in a continuous belt like form making it unnecessary to windup or waste the backing web. When this continuous belt as shown, diagrammatically, travels through the machine the natural action of it being pulled into and out of the machine and the winding up of the laminating web serves to separate the two. Edge guides may be used to guide the continuous strip and keep it from wandering from side to side.

In Figure 5 I have shown, diagrammatically, the mechanical set-up for continuous processing of a sheet or web H which is to be laminated by having a transparent film or other material I applied thereto from the roll of film 41. The elements of this set-up bear the same designations, generally speaking, as those in connection with the previous figures and the manner of driving the laminating machine of Figures 1 and 2 is also herein set forth.

The variable speed motor J, with suitable control not shown, through the medium of a belt or chain K drives the lower roll B of the laminating nip and from this a blet or chain L drives the leadout roll M which is contacted by the free rider roll N capable of moving up or down. From the roll M a belt or chain O drives the windup drum P which winds up the finished laminated product resulting from the combination of H and I which passes under the dams E as shown together with the continuous belt Q which is of at least the width of the material H and usually one or two inches wider. This belt Q is of a material such as Mylar, Teflon, or Kel-F, which is tough and capable of being readily freed from the laminated product and is rigid enough in its width dimension to form a backing web.

As this passes over the leadout roll N the laminated combination of H and I is wound up on the drum P driven by the chain or belt O. It will thus be seen that with the bead of adhesive placed in the proper position between the adjusted dams E the continuous belt is returned again and again to serve as a support and carrier strip in laminating the combination of H and I regardless of whether H is a web or underlapped sheets as previously described.

One thing I have not mentioned before is that the roll A can be lifted away from the roll B when laminating is finished and thus the excess adhesive left over is thereby readily dumped from the nip of the machine and since the laminating rolls A and B and the leadout rolls M and N are always covered by the film or the web being laminated such as H the machine cleans itself.

In processing laminated products either by the machine shown in the original Figures 1 and 2 or as in Figure 5 there is a differential in speed between the laminating rolls and the leadout rolls of about 1% which serves to keep a slight tension on the web at all times and furthermore when the laminated product is wound up, as indicated, on the drum P there is a considerable difference in the ratio of pulleys or sprockets that drive the combination of M and P such that some slip always takes place in this drive which is specifically a belt drive in this case. This arrangement results in the laminated product always freeing itself from the backup web Q of kraft paper 40 or Mylar etc. and results in a tightly wound bundle at P.

This differential in the slip belt drive can be as great or sometimes greater than 10% to achieve this result.

In Figure 3 the crosshead set up is different than in Figures 1 and 2 where the upper nip roll A is raised and lowered by manipulation of the screw knobs 17 and 18. In this preferred set up the frame and crosshead are the same except that the lower end of a threaded shank eye bolt 50 is pinned into the upper side of the crosshead as shown at 51 and a hold down plate 52 secured to the frame by pins 53 acts as a guide for the upper unthreaded portion of the eye bolt shank. This hold down plate is slotted to fit over the upper edge of the machine frame and also cut out at right angles to the frame as shown at 54 for clearance to accommodate spring centering washers 55 and 56 at each end of the spring 57 which surrounds the shank of the eye bolt 50. A threaded spanner nut 58 having holes 59 for a spanner wrench is below spring washer 56 and is adjustable along the shank of the eye bolt 50 to increase or decrease the spring compression and thus regulate the pressure at the nip between rolls A and B. This will control the amount of adhesive or thinness of the adhesive film trapped between the two surfaces to be laminated. Each crosshead 6 and 7 in this modification may be provided with a bracket 60 secured thereto as shown and receiving a plain rod 61 along which slides a sleeve 62 which is threaded on its exterior to receive a nut 63, between the head 64 of the sleeve 62 and the nut 63 are two machined washers 65 which are separated to receive the dam 66 of the reversed C type and the opening 67 which is large enough to permit adjustment of the dam up or down, in or out with respect to the upper nip roll A and which is secured in this position by the washers 65 of a larger outside diameter than the dimension of the opening 67 so that when nut 63 is brought up tight the dam is fixed in position and must move with the crosshead and roll A as the nip between rolls A and B opens and closes either due to the raising of the crosshead by passage of materials through the nip or by the operation of the overhead eccentric or cam 68 which is slotted as shown at 69 to receive the eye bolt end on a pin 70 passing through it and the slotted end of the cam 68 which bears against the upper face of 52. As there are crossheads on each side of the machine a bar 71 is fixed between the opposite cams 68 on the machine and the cams 68 are so dimensioned as shown that when rotated on the pins 70 by moving the bar 71 to either of the extreme positions the nip roll A is raised thus compressing the spring 57. In one extreme position the cam face 72 is so shaped as to permit the nip roll A to be locked in the raised position.

While, in the foregoing, I have described a specific embodiment of machine it is nevertheless to be understood that in actual practice many modifications may be made in the mechanical construction of the machine without departing from the scope of the appended claims defining the invention.

I claim:

1. In a combining machine for webs and sheets, a pair of rolls urged together to form a nip therebetween and separable by a sheet or web passing through the nip, dams on the entrance side of said nip and adjustably spaced to form an adhesive reservoir behind the nip, said dams having surfaces conforming to the face of one of the combining rolls and an adjacent surface extending rearwardly of the nip and resting on the web or sheet to be laminated, a web supply unwinding around the nip roll against which the surfaces of the dams bear so as to confine the adhesive to the width of the unwinding web supply or less, a sheet or web supporting table having its surface in the plane of the nip line between the rolls whereby operation of the rolls to draw the webs into the nip distributes adhesive from the reservoir uniformly over the contiguous surfaces and unites the same under the bonding pressure of the nip as the combination of webs or sheets passes therethrough, and means for driving the rolls to draw the web or sheets through the nip thereof.

2. In a combining machine for webs and sheets, a pair of rolls resiliently urged together to form a nip therebetween and separable by a sheet or web passing through the nip, dams on the entrance side of said nip and adjustably spaced to form an adhesive reservoir behind the nip, said dams having surfaces conforming to the face of one of the combining rolls and an adjacent surface extending rearwardly of the nip and resting on the web or sheet to be laminated, a web supply unwinding around the nip roll against which the surfaces of the dams bear so as to confine the adhesive to the width of the unwinding web supply or less, a sheet or web supporting table having its surface in the plane of the nip line between the rolls whereby operation of the rolls to draw the webs into the nip distributes adhesive from the reservoir uniformly over the contiguous surfaces and unites the same under the bonding pressure of the nip as the combination of webs or sheets passes therethrough, and means for driving the rolls to draw the web or sheets through the nip thereof.

3. In a combining machine for webs and sheets, a pair of rolls resiliently urged together to form a nip therebetween and separable by a sheet or web passing through the nip, at least one of said rolls having a uniformly resilient surface, dams on the entrance side of said nip and adjustably spaced to form an adhesive reservoir behind the nip, said dams having surfaces conforming to the face of one of the combining rolls and an adjacent surface extending rearwardly of the nip and resting on the web or sheet to be laminated, a web supply unwinding around the nip roll against which the surfaces of the dams bear so as to confine the adhesive to the width of the unwinding web supply or less, a sheet or web supporting table having its surface in the plane of the nip line between the rolls whereby operation of the rolls to draw the webs into the nip distributes adhesive from the reservoir uniformly over the contiguous surfaces and unites the same under the bonding pressure of the nip as the combination of webs or sheets passes therethrough, and means for driving the rolls to draw the web or sheets through the nip thereof.

4. In a combining machine for webs and sheets, a pair of rolls resiliently urged together to form a nip therebetween and separable by a sheet or web passing through the nip, dams on the entrance side of said nip and adjustably spaced to form an adhesive reservoir behind the said nip, said dams having surfaces conforming to the face of one of the combining rolls and adjacent surface extending rearwardly of the nip and resting on the web or sheet to be laminated, and means supporting said dams so that they maintain their adjustment with respect to the surface of the roll and contact therewith irrespective of the movement of the roll occasioned by the thickness dimension of webs or sheets passing between the rolls, a web supply unwinding in contact with the nip roll and against which the surfaces of the dams bear so as to confine the adhesive to the width of the unwinding web supply or less, a sheet or web supporting table having its surface in the plane of the nip line between the rolls whereby operation of the rolls to draw the webs into the nip distributes adhesive from the reservoir uniformly over the contiguous surfaces and unites the same under the bonding pressure of the nip as the combination of webs or sheets passes therethrough, and means for driving the rolls to draw the web or sheets through the nip thereof.

5. In a combining machine for web to web or web to sheet laminating, a supporting frame mounting a pair of combining rolls with parallel axes, means for feeding a web thru the nip of the combining rolls from a position in which it is partially wrapped around one of the rolls in advance of entering the nip, a supporting table having its leading edge parallel with and adjacent to the line of the combining nip and for receiving a sheet or web to be propelled into the combining nip to meet the face of the afore mentioned web, dams fitted on their leading faces to contact a portion of the web as wrapped around the combining roll where it enters the nip, each dam reducing to a thin knife like edge stopping just short of the nip line and the lower faces of said dams being parallel to the face of the supporting table and spaced therefrom the approximate thickness of the web or sheet travelling beneath the dams and table surface whereby the space between the opposing side faces of the dams and the nip between the separate layers to be laminated together form a reservoir for a bead of liquid adhesive, and power means to rotate the combining rolls to draw the layers through the nip and unite them in intimate contact while spreading the bead of adhesive uniformly on the surfaces thereof.

6. In a sheet or web laminating machine, a pair of combining rolls defining a horizontal nip in which one roll is arranged above the other, means for driving at least one of said rolls, means for drawing webs or sheets from a supply into a nip between combining rolls, said webs or sheets being protectors of the roll surfaces while being combined, the nip between the rolls serving to compress the sheets together, a pair of side dams contacting at least one of the sheets at the face of one of the rolls and conforming to the surface contacted to confine the adhesive between the dams while the web is traveling into the nip.

References Cited in the file of this patent

UNITED STATES PATENTS

| | | |
|---|---|---|
| 1,641,403 | Van Derhoef | Sept. 6, 1927 |
| 2,169,975 | Gold | Aug. 15, 1939 |
| 2,171,259 | Scott | Aug. 29, 1939 |
| 2,208,060 | Wagner | July 16, 1940 |
| 2,234,223 | Ball | Mar. 11, 1941 |
| 2,255,397 | Sidebotham | Sept. 9, 1941 |
| 2,453,258 | Pearson | Nov. 9, 1948 |

FOREIGN PATENTS

| | | |
|---|---|---|
| 744,669 | Great Britain | Feb. 15, 1956 |
| 783,785 | Great Britain | Oct. 2, 1957 |